Dec. 24, 1963  I. L. BLOWERS  3,115,033
COMPRESSION TESTER
Filed Dec. 18, 1959
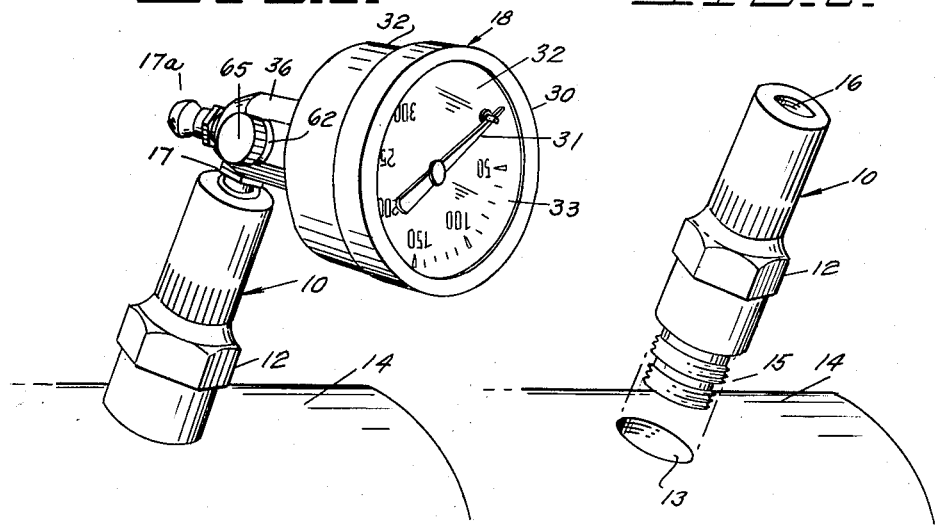
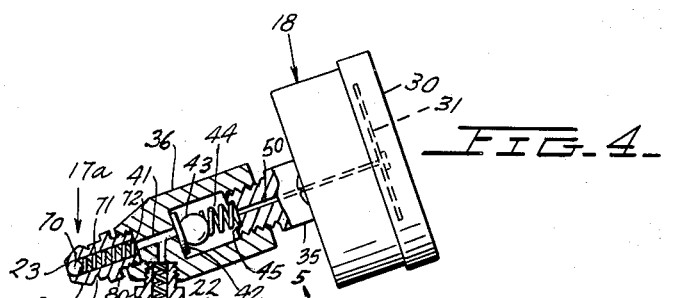
INVENTOR.
IVAN L. BLOWERS
BY
OSTROLENK, FABER, GERB & SOFFEN
ATTORNEYS.

United States Patent Office 3,115,033
Patented Dec. 24, 1963

3,115,033
COMPRESSION TESTER
Ivan L. Blowers, Plainwell, Mich., assignor to Kal-Equip Company, Otsego, Mich., a corporation of Michigan
Filed Dec. 18, 1959, Ser. No. 860,460
3 Claims. (Cl. 73—116)

The present invention relates to an internal combustion engine compression testing device and more particularly to a simplified, easily operable compression tester so arranged that it may readily be used in connection with the spark plug opening of any cylinder and further so arranged that it may easily be read and reset for the next compression testing operation.

More specifically, the invention contemplates the utilization of an adapter in the form of a tubular member having a threaded end which may be turned into the spark plug opening. The end opposite the threaded end is provided with resilient retaining means into which one or more tubes each connected to the same compression gauge may be snapped. This latter tube is provided with a check valve, as well as with means for releasing compressed gases from above the check valve. The operator, after inserting the adapter in the spark plug opening, snaps the pressure gauge into the adapter, cranks the engine for a very short period of time, snaps the pressure gauge out of the adapter and reads the pressure. He then operates the bleed or release valve to reset the pressure gauge to zero and uses the adapter and pressure gauge in another cylinder. He thus is able readily to insert the elements for a test and, most important, he is readily able to read the gauge since the pressure thereof is retained when he takes it out of the adapter—a most important factor in the usual locations in which consumer automotive testing is performed and also an extremely important factor in testing modern cars in which many devices which surround the engine make a direct reading at the spark plugs opening extremely difficult or impossible.

Heretofore compression testers have been provided in the form of pressure gauges having extensions which might be secured directly in the spark plug opening.

For purposes of securement, various types of resilient conical insert members have been used which were intended, but not really designed, to hold the unit in position during the running of the engine. The reading of the pressure gauge while it was placed in the spark plug opening frequently involved the utilization of considerable bodily dexterity on the part of the mechanic. In an effort to solve this problem, such pressure gauges have been provided with relatively long extension hoses connected to a member which may be squeezed into the spark plug opening, the hoses being bendable around the various appliances which now surround the motor. The difficulty encountered was that the hoses frequently fouled on the various appliances, tended to become torn and twisted, resulting in blowing out under pressure.

The primary object of this invention is the provision of a novel compression testing device comprising an adapter which may readily be threaded into the spark plug opening and a pressure gauge having a plurality of short tubular extensions each of which may be snapped into the free end of the adapter.

A further object of the invention is the provision in such a snap-in pressure gauge of a check valve for retaining the pressure so that the pressure reading may readily be taken at a point remote from the pressure source.

A further object of the invention is the provision of such a check valved pressure gauge in connection with simplified means for bleeding off the pressure retained in the pressure gauge housing preparatory to the next operation.

Still another object of the invention is the provision of a novel tubular adapter with a plurality of threaded ends so arranged that it may be secured in different size threaded spark plug openings.

Since the short tube attached to the gauge must clear adjacent accessories, I have found it advantageous to provide a plurality of such tubes on the single unit which will enable the mechanic to utilize the unit in all makes of cars, selectively using either of the tubes as the structure of the vehicle, the engine and adjacent accessories required.

The foregoing and many other objects of this invention will become apparent in the following description and drawings, in which:

FIGURE 1 is a view in perspective of the novel pressure gauge and adapter secured in the spark plug opening of a cylinder of an internal combustion engine preparatory to the running of the engine in order to obtain a pressure reading.

FIGURE 2 is a view in perspective of the novel tubular adapter of the present invention.

FIGURE 3 is a vertical cross-sectional view of the adapter of FIGURE 2.

FIGURE 4 is a side view in partial cross-section of the pressure gauge of FIGURE 1.

FIGURE 5 is a view partially in cross-section of a section of the pressure gauge extension taken from line 5—5 of FIGURE 4 looking in the direction of the arrows.

Referring now to the figures, the novel adapter 10 is provided with an internal tubular opening 11 (FIGURE 3) which communicates with both ends of the adapter 10. The adapter 10 is also provided with a central hexagonal section 12 adapted to be operated by a spark plug tool, should that be necessary, but also so arranged that the section 12 may be manually operated to rotate the adapter into a spark plug opening 13 of the internal combustion engine 14. Preferably the hexagonal section 12 is integral with the material of the adapter 10 and while it is shown here as hexagonal may obviously be of any shape adapting it to be engaged either manually or by a tool which is intended to rotate the same.

The lower end of the adapter 10 is provided with a threaded section 15 which will engage the threads in the spark plug opening 13. Since, in general, spark plug openings of internal combustion engines utilized in automobiles are of two different sizes, the provision of two threaded sections 15a and 15b at the lower end of the adapter 10 will permit the adapter to be used with most such engines.

The smaller threaded section 15b is below the larger threaded section 15a so that when the adapter is inserted in an opening of diameter to match section 15a, then the threaded section 15b will enter somewhat into the cylinder by only a short amount and will clear the larger opening. When the adapter 10 is inserted in a smaller opening to match threaded section 15b then, of course, the larger threaded section 15a will extend above the block of internal combustion engine 14.

The upper end of the adapter 10 is provided with a bayonet opening 16 which will receive one of the two bayonet or snap-in extensions 17, 17a of the pressure gauge assembly 18. Just inside the opening 16 a plurality of circumferential gripping fingers 19 is provided which may in one form be a cylinder of resilient metallic material slit from the upper edge along lines 25 substantially parallel to the axis of the cylinder to provide a plurality of resilient fingers. The upper end of the fingers 20 are inwardly bent to provide a resilient gripping edge. Each bayonet extension 17, 17a of the pressure gauge assembly 18 is provided with a cam surface 21 which will move past the inwardly bent ends 20 of fingers 19 and with an annular groove 22 in which the finger ends 20 will engage.

The tubular opening 11 in adapter 10 has a cross-section which is much smaller than the lower face 23 of the bayonet extension 17 so that the pressure per square inch on this tubular face 23 is greatly reduced thereby requiring much less retaining force by the co-action of finger ends 20 and grooves 22 to retain the pressure gauge assembly 18 in position during the compression test.

A resilient plug 20a is provided at the lower end of the cylinder forming fingers 20 and against which surface 23 of the bayonet extension 17 will seat. This will provide a firm hermetic interconnection between the bayonet and the adaptor so that pressure should not appear at surface 23. However even if pressure does appear at surface 23 the difference in area between surface 23 and tubular pasage 11 will ensure that this pressure at surface 23 will not be sufficient to blow out the pressure gauge assembly 18.

The pressure gauge assembly 18 comprises a standard pressure responsive member 30 in which a pointer 31 will move in response to variations in pressure within the housing 32 of the pressure gauge 30 around a dial 33 which is appropriately marked. The pressure gauge housing 30 has a nipple 35 extending therefrom which is threaded and secured into a valve housing 36. The valve housing 36 is connected to the bayonet extensions 17 and 17a. Each bayonet extension 17 extends up into the valve housing 36. A tubular opening 41, in the bayonet extension, communicates with the valve seat 42 in the valve housing 36. A ball check valve 43 is biased in position against the valve seat 42 by the compression spring 44 which bears in the recess 45 of the nipple 35. When either bayonet extension 17, 17a of the pressure gauge assembly 18 is snapped into the adapter 10, a connection is made from the interior of the cylinder by adapter tube 11 to bayonet tube 41 to the interior of valve housing 36 and through tube 50 in nipple 35 to the pressure gauge housing 32.

Each extension 17, 17a is provided with its own check valve 70 biased by spring 71 bearing against crimp 72 toward closed position. Since these check valves are so small, a rubber seat at these points is not practical; hence the main check valve 43 bearing against a resilient seat is also provided.

The two bayonet extensions 17 and 17a are provided so that the mechanic may select either one for insertion, thereby making it possible, in different vehicles, to clear all accessories; this arrangement makes the unit usable for all standard automobiles in existence today.

It will now be obvious that any gases under pressure entering through tubes 11 and 41 will displace the particular valve 70 and also valve 43 against the bias of spring 44 to permit the gases to enter through tube 50 into the pressure gauge housing 32; it will also be obvious that the gases cannot return since the pressure thereof when cranking of the motor is stopped prior to the withdrawal of the pressure gauge assembly will close the valve 43 against its seat 42. In addition, if the engine is cranked for more than a few cycles, the check valve 43 will retain maximum pressure rate. Thereafter in order to read the pressure gauge dial 33 conveniently the pressure gauge may be snapped out and examined.

As shown in FIGURE 5, a bleeder valve assembly 60 may be provided consisting of a threaded opening 61 in the side of valve housing 36 over which an O-ring 62 or other sealing member may be provided in a recess 63 in housing 36, the said O-ring 62 or other sealing member being secured in closed position by the threaded clamp 64 having the knurled knob 65. When the clamp member 64 is screwed in, clamp 64 seals the sealing member 62 in recess 63 against the escape of pressure from valve housing 36. When it is loosened slightly (it need not be taken out altogether) the pressure trapped in valve housing 36 escapes.

In order to maintain alignment, to a reasonable degree of passages 41 and 11 and to limit the swing of the gauge in the adapter to prevent the axes of the passages to swing so far out of alignment as to strain the bayonet lock and create a leak, the nuts 80 are widened on the side toward which the gauge may tilt thereby limiting this tilt.

By this means therefore there is provided a novel and extremely simple compression testing device in which an adapter may be inserted in a spark plug opening in the same simple way in which a spark plug would be inserted. A pressure gauge is snapped into the adapter. The engine is cranked. The pressure gauge is snapped out. A reading is taken at a convenient reading level.

It will be obvious that many variations of this invention are possible. By way of example, the snap arrangement may consist of a reversal of parts with a bayonet extension on the adapter and resilient fingers extending from the valve housing 36.

By this means also, compressible or resilient sealing members for the spark plug openings are obviated, complex and easily fouled and twisted hoses are eliminated, and a convenient and readily usable tester is provided.

In the foregoing the invention has been described solely in connection with preferred illustrative embodiments thereof. Since many variations and modifications of the invention will now be obvious to those skilled in the art, it is preferred that the scope thereof be determined, not by the specific disclosure herein contained, but only by the appended claims.

I claim:

1. A compression tester for an internal combustion engine having a cylinder with a spark plug opening comprising: an adapter member having a continuous passage from one end thereof to the other; one of the two ends of said adapter being arranged to be removably secured in the spark plug opening; a pressure gauge assembly having a pair of rigid extensions with a passage and a valve in each extension, a check valve and a pressure gauge; said valves in said extensions preventing fluid escape of pressure through either extension when the other extension is secured to said adapter means for releasably selectively securing one of said extensions to the second of the two ends of the adapter member, said extensions being disposed with respect to each other so that said gauge can be selectively positioned with respect to said adapter.

2. A compression tester for an internal combustion engine having a cylinder with a spark plug opening comprising: an adapter member having a continuous passage from one end thereof to the other; one of the two ends of said adapter being arranged to be removably secured in the spark plug opening; a pressure gauge assembly having a pair of rigid extensions angularly related to each other with a passage and a valve in each extension, a check valve housing having a check valve and a pressure gauge; means for releasably selectively securing one of said extensions to the second of the two ends of the adapter member, said check valve retaining maximum pressure reached in said check valve housing and pressure gauge and permitting the pressure gauge to retain its pressure reading when the pressure gauge is removed from the adapter member, said valves in said extensions preventing fluid escape through either extension when other extension is secured to said adapter.

3. A compression tester for an internal combustion engine having a cylinder with a spark plug opening comprising; an adapter member having a continuous passage from one end thereof to the other; one of the two ends of said adapter being arranged to be removably secured in the spark plug opening; a pressure gauge assembly comprising a pressure gauge, a check valve including a housing connected at one end thereof to said pressure gauge, a pair of angularly related rigid extensions connected directly to said housing at the other end thereof; each of said extensions having through passages; said housing having passages interconnecting one end of said through passages and said check valve; said check valve arranged to normally block fluid flow from said one end of said housing to said other end thereof; a valve in each of said through passages of said extensions; each of said valves comprising check valves constructed and positioned to block fluid flow from the other end of one of said through passages through said passages and out the other end of the other of said through passages; means removably; securing one of said extensions to the second of the two ends of said adapter member; said first-mentioned check valve retaining maximum pressure reached in said check valve housing and pressure gauge and permitting the pressure gauge to retain its pressure reading when the pressure gauge is removed from the adapter member, said extensions having their respective axes oriented at different angular positions with respect to the axis of said housing to selectively position said pressure gauge assembly with respect to said adapter member.

References Cited in the file of this patent

UNITED STATES PATENTS

| | | |
|---|---|---|
| 898,213 | Gibson | Sept. 8, 1908 |
| 1,227,563 | Allen | May 29, 1917 |
| 1,569,178 | Foster | Jan. 12, 1926 |
| 1,657,047 | St. John | Jan. 24, 1928 |
| 1,711,870 | Zerk | May 7, 1929 |
| 1,799,832 | Rinne et al. | Apr. 7, 1931 |
| 2,122,243 | Bonhard | June 28, 1938 |
| 2,238,958 | Wells | Apr. 22, 1941 |
| 2,625,033 | Adair | Jan. 13, 1953 |
| 2,764,769 | Neuman | Oct. 2, 1956 |
| 2,862,386 | Campbell et al. | Dec. 2, 1958 |

FOREIGN PATENTS

| | | |
|---|---|---|
| 701,541 | France | Jan. 12, 1931 |
| 801,735 | Great Britain | Sept. 17, 1958 |